(12) United States Patent
Banatwala et al.

(10) Patent No.: US 9,244,921 B2
(45) Date of Patent: *Jan. 26, 2016

(54) ALTERING RELEVANCY OF A DOCUMENT AND/OR A SEARCH QUERY

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,992

(22) Filed: Sep. 18, 2014

(65) Prior Publication Data

US 2015/0006530 A1 Jan. 1, 2015

Related U.S. Application Data

(63) Continuation of application No. 13/891,556, filed on May 10, 2013.

(51) Int. Cl.
*G06F 17/30* (2006.01)
*G06Q 50/00* (2012.01)

(52) U.S. Cl.
CPC .... *G06F 17/30011* (2013.01); *G06F 17/30864* (2013.01); *G06F 17/30867* (2013.01); *G06Q 50/01* (2013.01)

(58) Field of Classification Search
CPC .............. G06Q 50/01; G06F 17/30867; G06F 17/30864; G06F 17/30011
See application file for complete search history.

(56) References Cited

U.S. PATENT DOCUMENTS

| | | | |
|---|---|---|---|
| 6,571,239 B1 | 5/2003 | Cole et al. | |
| 7,505,956 B2 | 3/2009 | Ibbotson | |
| 7,941,535 B2 | 5/2011 | Sherrets et al. | |
| 2005/0138056 A1* | 6/2005 | Stefik et al. | 707/102 |
| 2006/0294085 A1* | 12/2006 | Rose et al. | 707/3 |
| 2007/0214126 A1 | 9/2007 | Kikinis | |
| 2007/0233672 A1 | 10/2007 | Sanfacon et al. | |
| 2010/0005087 A1* | 1/2010 | Basco et al. | 707/5 |
| 2010/0106719 A1 | 4/2010 | Donato et al. | |
| 2010/0121849 A1 | 5/2010 | Goeldi | |

(Continued)

OTHER PUBLICATIONS

International Search Report together with the Written Opinion of the International Searching Authority dated Jul. 16, 2014 from International Application No. PCT/CA2014/050339.

(Continued)

*Primary Examiner* — Shiow-Jy Fan
(74) *Attorney, Agent, or Firm* — Scully, Scott, Murphy & Presser, P.C.; Dermott Cooke, Esq.

(57) ABSTRACT

Various embodiments provide for altering relevancy of a document by adding (e.g., to an index associated with the document) one or more term relationships (which may result, for example, in adding one or more non-obvious terms). Other embodiments provide for altering relevancy of a search query by adding to the search query one or more terms based upon one or more determined term relationships (in one example, the added term(s) may be one or more non-obvious terms).

6 Claims, 4 Drawing Sheets

(56) References Cited

U.S. PATENT DOCUMENTS

| | | |
|---|---|---|
| 2011/0179025 A1 | 7/2011 | Chuang |
| 2011/0320441 A1* | 12/2011 | Lee et al. .................... 707/723 |
| 2012/0023098 A1 | 1/2012 | Dean et al. |
| 2012/0078920 A1 | 3/2012 | Kim |
| 2012/0278341 A1 | 11/2012 | Ogilvy et al. |
| 2012/0310969 A1 | 12/2012 | Heidasch |
| 2013/0031088 A1* | 1/2013 | Srikrishna et al. ............ 707/722 |
| 2013/0110827 A1* | 5/2013 | Nabar et al. .................. 707/728 |

OTHER PUBLICATIONS

U.S. Office Action dated May 22, 2015 issued in U.S. Appl. No. 13/891,556.

* cited by examiner

ALTERING RELEVANCY OF A DOCUMENT AND/OR A SEARCH QUERY

CROSS-REFERENCE TO RELATED APPLICATIONS

This application is a continuation of U.S. Ser. No. 13/891,556, filed on May 10, 2013, the entire content and disclosure of which is incorporated herein by reference.

BACKGROUND

The present disclosure relates generally to the field of altering relevancy of a document by adding (e.g., to an index associated with the document) one or more term relationships (which may result, for example, in adding one or more non-obvious terms).

The present disclosure also relates generally to the field of altering relevancy of a search query by adding to the search query one or more terms based upon one or more determined term relationships (in one example, the added term(s) may be one or more non-obvious terms).

In various examples, altering relevancy of a document and/or a search query may be implemented in the form of systems, methods and/or algorithms.

In a conventional Internet search engine documents are continually identified and indexed. FIG. 1 shows one example of three hypothetical documents (in this example, Webpage A (identified by callout number 101), Webpage B (identified by callout number 103) and Text Document A (identified by callout number 105)). Also shown is the corresponding Index 107 that is maintained by the Internet search engine (not shown). As seen, in this example, Webpage A includes three different terms: Term 1, Term 2 and Term 3. Further, in this example, Webpage B includes four different terms: Term 4, Term 5, Term 6 and Term 7. Further still, in this example, Text Document A includes 2 different terms: Term 8 and Term 9. Finally, in this example, Index 107 identifies, for each respective document, the associated terms. Each of the terms may be a single word or multiple words.

In operation, when a user performs a search using the conventional Internet search engine, the user will enter one or more terms as keyword(s). The keyword(s) will be compared against the contents of the index and, based upon any matches between the keyword(s) and the indexed terms, the corresponding documents(s) will be returned to the user as the search results (the documents may be returned, for example, in the form of links). To give one concrete example, if the user inputs as two keywords the terms "Term 4" and "Term 9", then Webpage B and Text Document A would be returned as search results.

In one specific example of a conventional Internet search engine, when a user performs a search the search engine checks the user's search history and the user's friends' search histories and gives the user results, for example, based on what the user looked at before, based on the user's friend's results that are similar to the user's results and based on what the user's friends have shared on social networking websites and the like. In this regard, it is believed that the search engine results (and any increase/decrease in relevancy) are based only on links that match to things shared from people in the user's social network.

SUMMARY

In various embodiments, methodologies may be provided that automatically alter relevancy of a document and/or a search query by use of one or more term relationships.

In one embodiment, a term relationship identification method used in connection with a social network having a plurality of social networking partners is provided, the method comprising: identifying by a processor at least one term in a first document, the first document having been created by one of the plurality of social networking partners; determining by the processor an association between the first document and at least a second document, the second document having been created by one of the plurality of social networking partners; and improving by the processor a search result based upon the determined association of the first document with the second document, wherein the identified term in the first document is used to include the second document in the search result.

In another embodiment, a computer readable storage medium, tangibly embodying a program of instructions executable by the computer for identifying a term relationship in connection with a social network having a plurality of social networking partners is provided, the program of instructions, when executing, performing the following steps: identifying at least one term in a first document, the first document having been created by one of the plurality of social networking partners; determining an association between the first document and at least a second document, the second document having been created by one of the plurality of social networking partners; and improving a search result based upon the determined association of the first document with the second document, wherein the identified term in the first document is used to include the second document in the search result.

In another embodiment, a system for identifying a term relationship in connection with a social network having a plurality of social networking partners is provided, the system comprising: an identifying element configured to identify at least one term in a first document, the first document having been created by one of the plurality of social networking partners; a determining element configured to determine an association between the first document and at least a second document, the second document having been created by one of the plurality of social networking partners; and an improving element configured to improve a search result based upon the determined association of the first document with the second document, wherein the identified term in the first document is used to include the second document in the search result.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
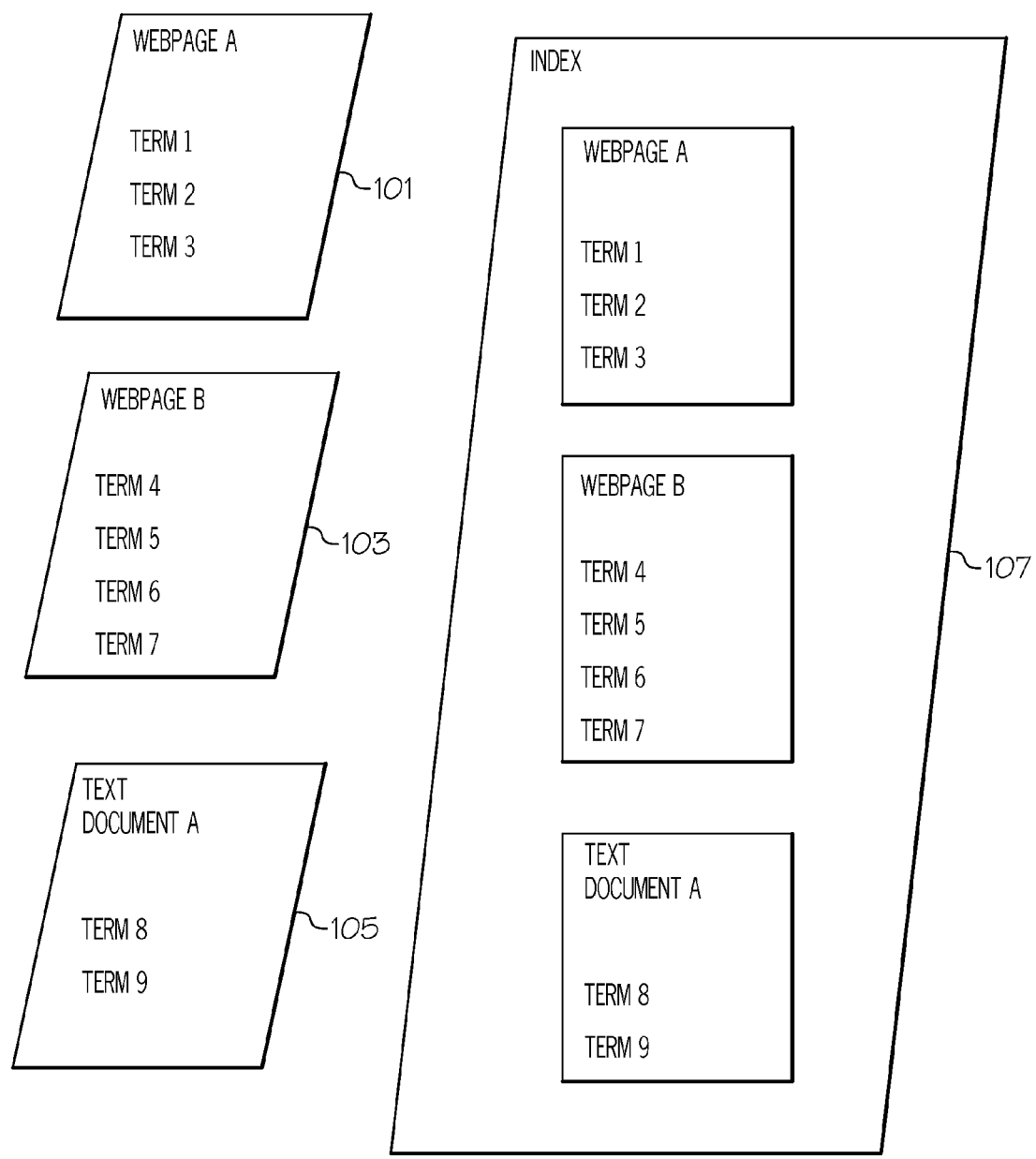
FIG. 1 depicts a diagram associated with conventional indexing of terms associated with an Internet search.

In one example, one or more systems, methods and/or algorithms may be provided that automatically alter relevancy of a document and/or a search query.

For the purposes of describing and claiming the present invention the term "social network" is intended to refer to a grouping of people according to one or more relationships between and/or among them. In one example, a social network may include a plurality of members and may be organized and maintained via a computer system.

For the purposes of describing and claiming the present invention the term "social networking partners" is intended to refer to two or more people in a social network who are related in some manner. In various examples, such relationships may be as family, as friends, as work colleagues, as associates, as "a friend of a friend", as graduates of the same school and/or any other desired feature or characteristic.

For the purposes of describing and claiming the present invention the term "result" or "search result" is intended to refer to a document identified by an electronic search, wherein the search is based upon a query comprising one or more keywords input for the search. In various examples, such an identified document may be a webpage (e.g., a hypertext markup language (HTML) webpage), a wiki page, a blog post (e.g., a micro-blog post), a word processing or text document, a portable document format (PDF) document, a graphical or combination graphical and text presentation document, or a spreadsheet or other tabular document.

For the purposes of describing and claiming the present invention the term "result set" is intended to refer to a set including one or more results.

For the purposes of describing and claiming the present invention the term "search result set" is intended to refer to a set including one or more search results.

For the purposes of describing and claiming the present invention the term "search phrase" is intended to refer to one or more keywords or a set of one or more terms.

For the purposes of describing and claiming the present invention the term "association" (such as used in the context of "association of one document with another") is intended to refer to an explicit or implicit relationship. Examples include (but are not limited to): a first word having a connection to a second word based on context; a search query that results in selection by a user of a given search result.

When performing an electronic search, a user will typically enter one or more keywords and results are returned based on the relevancy of the keywords entered. Since language can often have multiple different words/terms for the same or similar concepts, it is often the case in a conventional search that a potential result that is not returned (but that may nevertheless be relevant) does not include the keywords(s) that a person used for a search. Various embodiments solve this problem by use of term relationships.

Further, under various embodiments if a given search result proved to be useful to one or more users, in essence, those users have indicated that keywords that they have used should indeed be considered relevant to the result in question.

Reference will now be made to one example according to an embodiment. In this example, three people perform a search as follows: user 1 searches using terms "x, y, z"; user 2 searches using terms "x, a, b"; and user 3 searches using terms "x z q".

Document "M" is returned as result #12 for user 1, as result #42 for user 2, and as result #3 for user 3. Those users (user 1, user 2 and user 3) have found document "M" to be useful (such as determined, for example, via click through such that each user clicks a result link and does not quickly come back to the result list). Further x is a term in document "M" but q, b and z are not terms, however, since the users (user 1, user 2 and user 3) found document "M" useful, in essence, they have indicated that terms, "q, b, and z" should be added to document "M" (that is, the index for document "M") even though those terms are not in document "M".

In addition to this "crowd source" notion, as described herein various embodiments can help with leveraging one's social network. When user 1 above performs his search, the search algorithm can leverage the social network of user 1 to assign meaning to the terms used. In the case of user 1 being someone who is in the culture of information technology, a term like "Ajax" has meaning that is specific and can be ferreted from their social network. These meanings would be different from user 2 whose social network includes references to sporting teams in the Netherlands where "Ajax" refers to a team and not a method of requesting data from an HTTP server.

Figure 2:
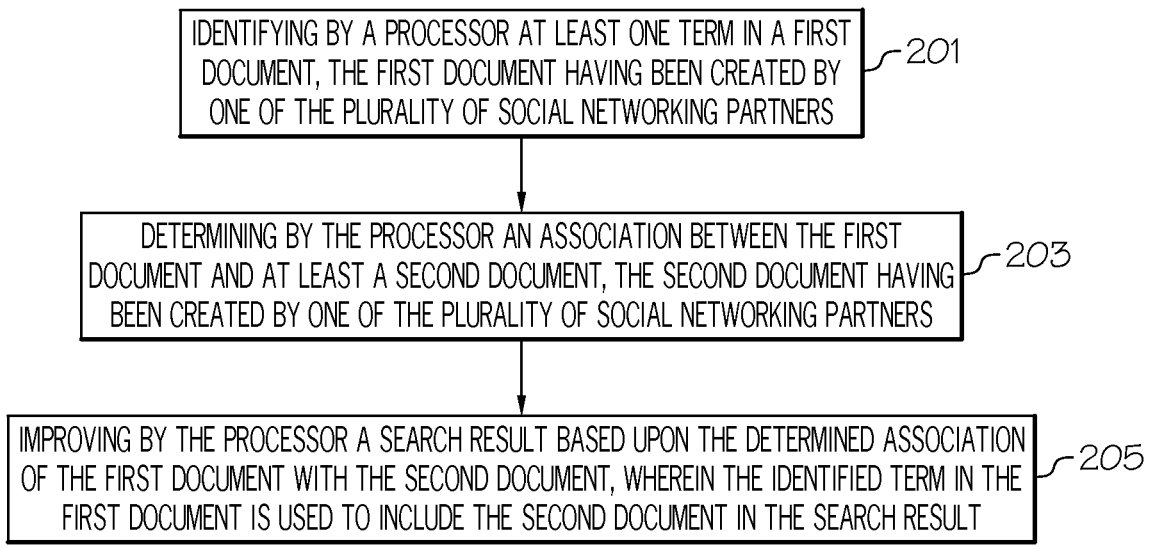
FIG. 2 depicts a block diagram of a flowchart according to an embodiment of the present invention.

Referring now to FIG. 2, a term relationship identification method used in connection with a social network having a plurality of social networking partners is shown. As seen in this FIG. 2, the method of this embodiment comprises: at 201—identifying by a processor at least one term in a first document, the first document having been created by one of the plurality of social networking partners; at 203—determining by the processor an association between the first document and at least a second document, the second document having been created by one of the plurality of social networking partners; and at 205—improving by the processor a search result based upon the determined association of the first document with the second document, wherein the identified term in the first document is used to include the second document in the search result.

In one example, any steps may be carried out in the order recited or the steps may be carried out in another order.

Figure 3:
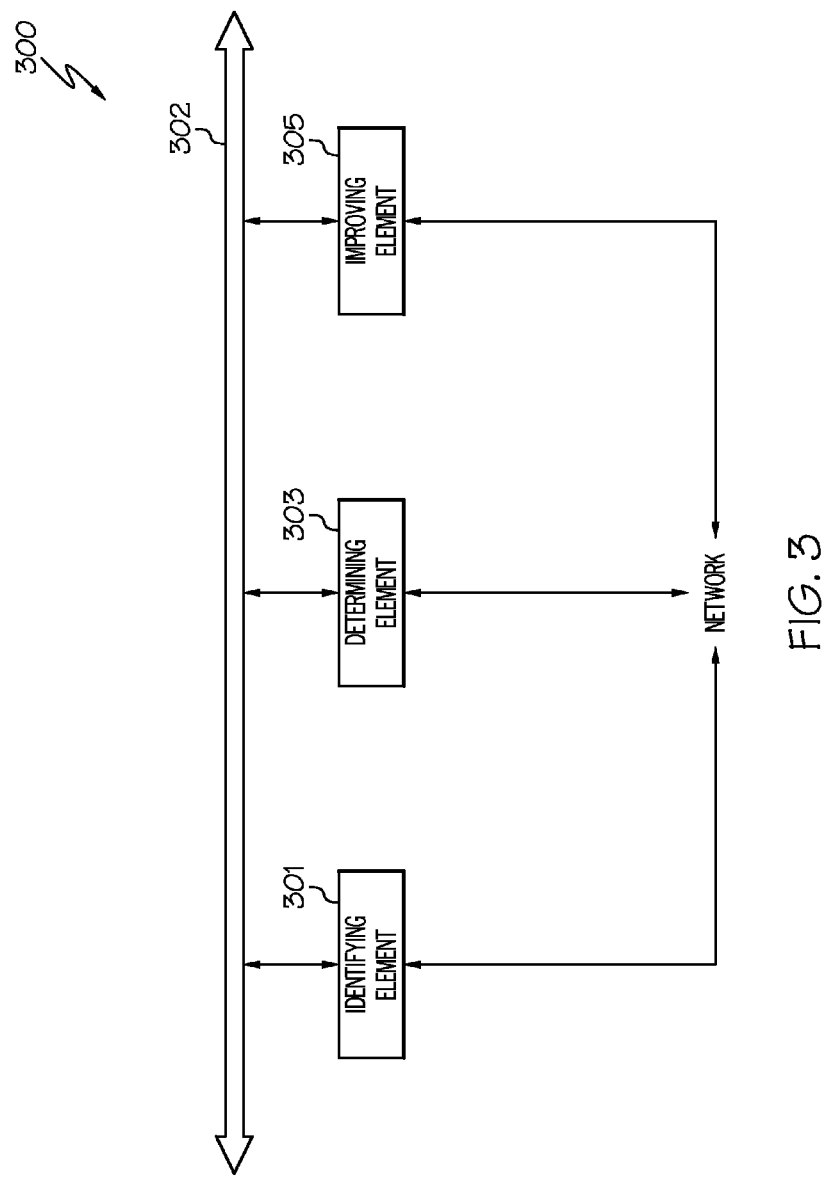
FIG. 3 depicts a block diagram of a system according to an embodiment of the present invention.

Referring now to FIG. 3, in another embodiment, a system 300 for identifying a term relationship in connection with a social network having a plurality of social networking partners is provided. This system may include the following elements: an identifying element 301 configured to identify at least one term in a first document, the first document having been created by one of the plurality of social networking partners; a determining element 303 configured to determine an association between the first document and at least a second document, the second document having been created by one of the plurality of social networking partners; and an improving element 305 configured to improve a search result based upon the determined association of the first document with the second document, wherein the identified term in the first document is used to include the second document in the search result (e.g., to improve the search result).

Still referring to FIG. 3, each of the elements may be operatively connected together via system bus 302. In one example, communication between and among the various elements may be bi-directional. In another example, the communication may be carried out via the Internet, an intranet, a local area network, a wide area network and/or any other desired communication channel(s). In another example, some or all of these elements may be implemented in a computer system of the type shown in FIG. 4.

Figure 4:
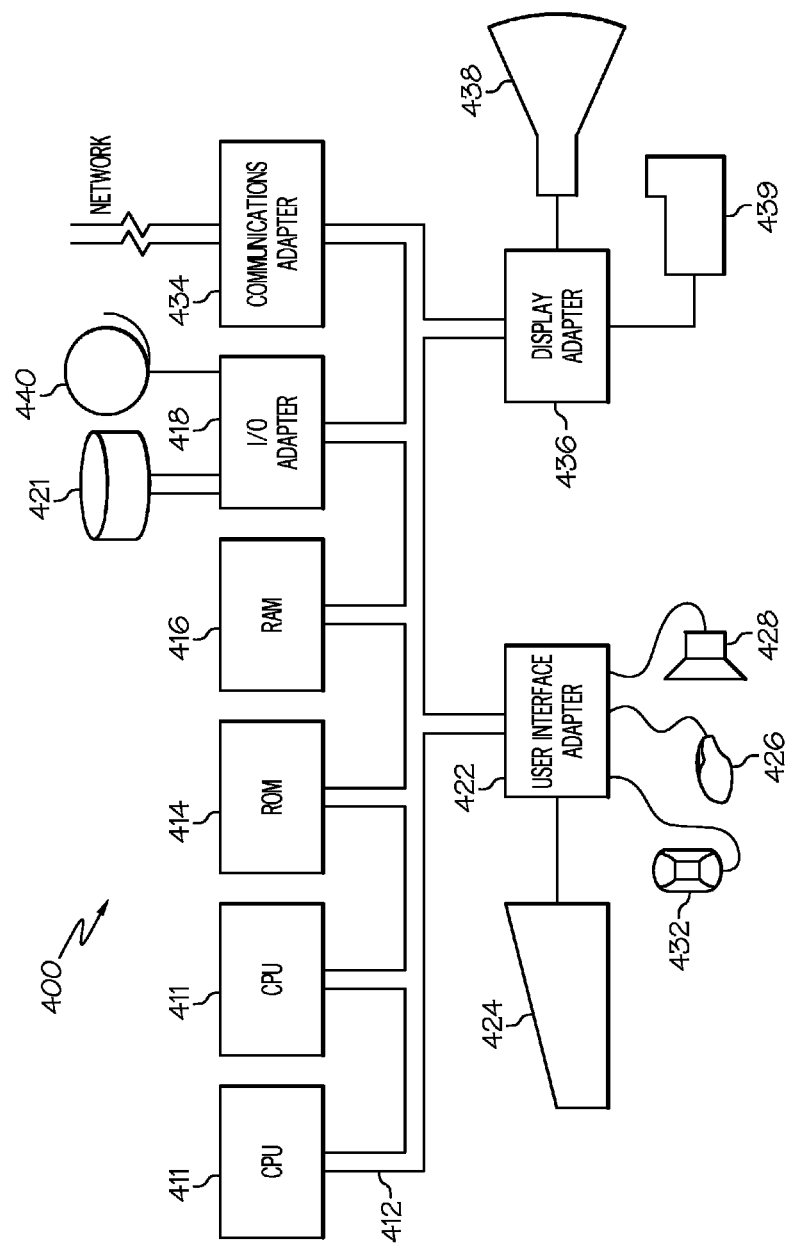
FIG. 4 depicts a block diagram of a system according to an embodiment of the present invention.

Referring now to FIG. 4, this figure shows a hardware configuration of computing system 400 according to an embodiment of the present invention. As seen, this hardware configuration has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communications adapter 434 for connecting the system 400 to a data processing network, the Internet, an intranet, a local area network (LAN), etc., and a display adapter 436 for connecting the bus 412 to a display device 438 and/or printer 439 (e.g., a digital printer or the like).

Of note, while various figures may show various entities communicating, it is to be understood that the figures are actually referring to communication by computer system(s) or the like that are owned, leased, operated, used by, in the possession of, and/or controlled by each of the entities.

As described herein, weighting may be applied to multiple users (e.g., weighting to search results).

As described herein, a relationship of terms may be based upon one or more input factors including: weight of frequency of occurrence of a term; and distance (and/or weight) on a "social graph" (e.g., separation between two social networking partners in a social network).

In one example, the shorter the medium in length, the more the weight of correlation.

As described herein, various embodiments may be applied to searching. As described herein, various embodiments may be applied to blogging (e.g., micro-blogging). In one specific example, blog posts can be monitored to look at terms used (when referring to a given post).

As described herein, each user may individually provide terms that if commonly used should increase the likelihood of a valid term relationship.

In another example, if terms are often found together (or otherwise have an association), they can be treated as having a term relationship in a term relationship table that is personalized for an individual or for a network of social networking partners (e.g., people who work together).

A term relationship table of the type disclosed herein that is associated with a given social network and a given group of social networking partners may be used in a number of ways.

One way is when a given social networking partner creates (and/or edits) a document, the index created for that document can be augmented by terms contained within that person's associated term relationship table.

Another way that a term relationship table may be used is when a given social networking partner issues a search query (including one or more keywords). In this regard, the query can be augmented by terms contained within that person's associated term relationship table.

As described herein, term relationships may be based upon context provided by a social network.

As described herein, mechanisms are provided for searching by adjusting relevancy based on adding terms to sources. Such mechanism may comprise, for example: receiving a plurality of search requests with a plurality of search terms from a plurality of users; identifying a relevancy for a returned source; adding terms (e.g., associations) to a source index for the returned source based on the relevancy; receiving a search request from a user; and returning an ordering of search results utilizing the source index and the relevancy with the added terms.

In one specific example, the mechanisms may further comprise: adding terms based on a social networking semantic relevance.

In another specific example, the mechanisms may further comprise: adjusting weighting (e.g., ranking and/or relevance) based on the social networking semantic relevance.

As described herein, mechanisms are provided to crowd source application of term relationships to influence indexing of terms.

As described herein, mechanisms are provided to leverage social networks to influence search results relevance.

As described herein, mechanisms are provided for utilizing semantics for searching. In various examples, searching may utilize semantic libraries of social networks to effect search results. In other examples, similar words in the future may be associated to items found in search results (e.g., based on those semantic libraries).

In another example, mechanisms may be provided to track the flow of information from one person to another and across a given social network (e.g., between and/or among social networking partners). For example, the flow of information can be tracked by one or more social networking feeds.

As described herein, various embodiments may be provided in the context of social computing (e.g., software, analytics), social collaboration and/or social communications.

As described herein, various embodiments may be provided in the context of mobile integration.

As described herein, various embodiments provide for use of social networking postings to augment document indexing and/or search queries.

In other examples, various embodiments may be applied in the context of: (a) Cloud: Delivery model: Software as a Service (SaaS); (b) Software: Information and data management; and/or (c) Web Technology: Content management and use.

In one embodiment, a term relationship identification method used in connection with a social network having a plurality of social networking partners is provided, the method comprising: identifying by a processor at least one term in a first document, the first document having been created by one of the plurality of social networking partners; determining by the processor an association between the first document and at least a second document, the second document having been created by one of the plurality of social networking partners; and improving by the processor a search result based upon the determined association of the first document with the second document, wherein the identified term in the first document is used to include the second document in the search result.

In one example, the social networking partner that created the first document is the same as the social networking partner that created the second document.

In another example, the social networking partner that created the first document is distinct from the social networking partner that created the second document.

In another example, the search result that is improved results from an electronic search performed by one of: (a) the social networking partner that created the first document; and (b) the social networking partner that created the second document.

In another example, the search result that is improved results from an electronic search performed by a social networking partner distinct from each of: (a) the social networking partner that created the first document; and (b) the social networking partner that created the second document.

In another example, the first document is a search phrase of an electronic search performed by the social networking partner that created the first document; and the second document is a search result selected from a search result set by the social networking partner that created the first document.

In another example: the first document comprises at least one of: (a) a social network profile; (b) a social network post; (c) a blog post; (d) a webpage; (e) an email; (f) a search query; and (g) any combination thereof; and the second document comprises at least one of: (a) a social network profile; (b) a social network post; (c) a blog post; (d) a webpage; (e) an email; (f) a search query; and (f) any combination thereof.

In another example, the improving the search result comprises adding the identified term in the first document into an index associated with the second document.

In another example, the association between the first term and the second document has a stronger influence on relevance and inclusion in search results based on an existence of additional associations created by additional social networking partners.

In another example, the association between the first term and the second document only influences relevance and inclusion in search results for a subset of social networking partners.

In another example, the influence of the association between the first term and the second document for the subset of social networking partners is based on a social-graph relationship between one or more social networking partners contributing one or more associations and a social networking partner performing the search.

In another embodiment, a computer readable storage medium, tangibly embodying a program of instructions executable by the computer for identifying a term relationship in connection with a social network having a plurality of social networking partners is provided, the program of instructions, when executing, performing the following steps: identifying at least one term in a first document, the first document having been created by one of the plurality of social networking partners; determining an association between the first document and at least a second document, the second document having been created by one of the plurality of social networking partners; and improving a search result based upon the determined association of the first document with the second document, wherein the identified term in the first document is used to include the second document in the search result.

In one example, the social networking partner that created the first document is the same as the social networking partner that created the second document.

In another example, the social networking partner that created the first document is distinct from the social networking partner that created the second document.

In another example, the search result that is improved results from an electronic search performed by one of: (a) the social networking partner that created the first document; and (b) the social networking partner that created the second document.

In another example, the search result that is improved results from an electronic search performed by a social networking partner distinct from each of: (a) the social networking partner that created the first document; and (b) the social networking partner that created the second document.

In another embodiment, a system for identifying a term relationship in connection with a social network having a plurality of social networking partners is provided, the system comprising: an identifying element configured to identify at least one term in a first document, the first document having been created by one of the plurality of social networking partners; a determining element configured to determine an association between the first document and at least a second document, the second document having been created by one of the plurality of social networking partners; and an improving element configured to improve a search result based upon the determined association of the first document with the second document, wherein the identified term in the first document is used to include the second document in the search result.

In one example, the social networking partner that created the first document is the same as the social networking partner that created the second document.

In another example, the social networking partner that created the first document is distinct from the social networking partner that created the second document.

In another example, the search result that is improved results from an electronic search performed by one of: (a) the social networking partner that created the first document; and (b) the social networking partner that created the second document.

In another example, the more times that a given association occurs, the stronger the term relationship.

In another example, a given association may have a stronger influence based upon a first party having a relationship with a second party.

In another example, a given social-graph relationship may be based upon one or more common elements (including, but not limited to): a social network relationship; a shared community; a liking of the same post(s) and/or co-occurrence of a relationship between entities.

As described herein, in various examples, crowd sourcing may use user query terms as a dynamic and personalized set of terms relevant to documents. This may identify terms that are: 1) not in a synonym dictionary; 2) better weighted by usage patterns (e.g., more people using the term); and/or 3) personalized based on intersection with a user's social network and/or a user's usage of terms in connection with other queries.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A term relationship identification method used in connection with a social network having a plurality of social networking partners, the method comprising:
   identifying by a processor at least a first term in a first search phrase of a first electronic search performed by a first one of the social networking partners;
   identifying by the processor a first document as a search result of the first electronic search;
   identifying by the processor at least a second term in a second search phrase of a second electronic search performed by a second one of the social networking partners, wherein the second term is not included in the first search phrase and wherein the second search phrase includes the first term and the second term;
   identifying by the processor a search result set generated in response to the second search;
   determining by the processor an association between the first search phrase and the second search phrase responsive to the second one of the social networking partners making a selection from the search result set, the selection being the same document as the first document from the search result of the first electronic search, wherein the first document does not include the second term; and
   improving by the processor a subsequent search result based upon the determined association of the first search phrase with the second search phrase, wherein the second term not included in the first search phrase and not included in the first document is added to an index of the first document to include the first document in the subsequent search result.

2. The method of claim 1, wherein the search result that is improved results from an electronic search performed by one of: (a) the first social networking partner; and (b) the second social networking partner.

3. The method of claim 1, wherein the search result that is improved results from an electronic search performed by a social networking partner distinct from each of: (a) the first social networking partner; and (b) the second social networking partner.

4. The method of claim 1, wherein the association between the first search phrase and the second search phrase has a stronger influence on relevance and inclusion in search results based on an existence of additional associations created by additional social networking partners.

5. The method of claim 1, wherein the association between the first search phrase and the second search phrase only influences relevance and inclusion in search results for a subset of social networking partners.

6. The method of claim 5, wherein the influence of the association between the first search phrase and the second search phrase for the subset of social networking partners is based on a social-graph relationship between one or more social networking partners contributing one or more associations and a social networking partner performing the search.

* * * * *